(12) United States Patent
Menghnani (10) Patent No.: US 8,713,127 B2
(45) Date of Patent: Apr. 29, 2014

(54) TECHNIQUES FOR DISTRIBUTED STORAGE AGGREGATION (75) Inventor: Hitesh Menghnani, Bangalore (IN)

(73) Assignee: Novell, Inc., Provo, UT (US)

(*) Notice: Subject to any disclaimer, the term of this patent is extended or adjusted under 35 U.S.C. 154(b) by 558 days.

(21) Appl. No.: 12/025,999

(22) Filed: Feb. 5, 2008

(65) Prior Publication Data

US 2009/0198791 A1      Aug. 6, 2009

(51) Int. Cl.
G06F 15/167      (2006.01)
G06F 15/16       (2006.01)

(52) U.S. Cl.
USPC .......................................... 709/215; 709/217

(58) Field of Classification Search
USPC ....................................................... 709/215
See application file for complete search history.

(56) References Cited

U.S. PATENT DOCUMENTS

| 5,148,432 | A  | * | 9/1992  | Gordon et al. ................... 714/7 |
| 5,542,065 | A  | * | 7/1996  | Burkes et al. ................ 711/114 |
| 6,098,119 | A  | * | 8/2000  | Surugucchi et al. ........... 710/10 |
| 6,928,476 | B2 |   | 8/2005  | Bucher |
| 7,069,295 | B2 |   | 6/2006  | Sutherland et al. |
| 7,584,340 | B1 | * | 9/2009  | Colgrove ..................... 711/163 |
| 2002/0129049 | A1 | * | 9/2002  | Collins et al. ................ 707/500 |
| 2005/0125536 | A1 |   | 6/2005  | Bucher |
| 2006/0075063 | A1 |   | 4/2006  | Grosse et al. |
| 2006/0190716 | A1 |   | 8/2006  | Miller |
| 2006/0224853 | A1 | * | 10/2006 | Shimazaki et al. .......... 711/171 |
| 2006/0242382 | A1 | * | 10/2006 | Griess et al. ................. 711/170 |
| 2009/0216989 | A1 | * | 8/2009  | Kato et al. ................... 711/171 |

* cited by examiner

Primary Examiner — Joseph E Avellino
Assistant Examiner — James Baron
(74) Attorney, Agent, or Firm — Schwegman Lundberg & Woessner, P.A.

(57) ABSTRACT

Techniques for distributed storage aggregation are presented. A storage aggregation server interacts over a network with a plurality of contributing servers to organize and partition excess storage on each of the contributing servers as a logical Random Array of Independent Disks (RAID). Network resource can process Input/Output (I/O) operations over the network against the RAID using an Internet Small Computers Systems Interface (iSCSI) protocol.

11 Claims, 3 Drawing Sheets

TECHNIQUES FOR DISTRIBUTED STORAGE AGGREGATION

BACKGROUND

The Internet continues to experience exponential growth and so does content and information that are available via the Internet. For example, full length movies are now readily available over the Internet. Moreover, enterprises have made nearly all their records, transactions, and services available via World-Wide Web (WWW) browsers. Of course a variety of security mechanisms and protocols are also used in an effort to ensure proper security for accessing certain types of sensitive information.

Although storage devices have become less expensive and are being made with increasingly larger storage capacities, enterprises are still finding that storage maintenance, support, and growth are issues that regularly have to be addressed. This is so, due to a variety of ongoing issues such as: the need for high availability of information in the marketplace, the need for information versioning, and the need to account for exponential information growth. Accordingly, enterprises are determining that their storage needs are often outpacing the higher capacity storage devices, which are currently available in the industry.

However, nearly every appliance made today includes connection capabilities to the Internet and includes some form of data storage. Much of this storage capacity goes largely unused or is grossly underutilized. Enterprises have no practical and automated mechanism to manage and use this excess capacity in an efficient manner. As a result, enterprises continue to believe that the solution to their storage concerns is to continue to added storage devices to the enterprise's network. This means that the number of devices being managed by enterprises is proliferating at alarming rates and the wasted utilization for many of these devices continues to grow at the same time.

Thus, improved and automated techniques are desirable for providing efficient storage utilization and storage management.

SUMMARY

In various embodiments, techniques for distributed storage aggregation are presented. More specifically and in an embodiment, a method is provided for distributed storage aggregation. A plurality of contributing servers is identified over a network connection. Each of the contributing servers has excess storage capacity to collectively share over the network connection as blocks of storage. Next, configuration information is exchanged with each of the contributing servers for accessing the excess storage capacity. The excess storage capacity is partitioned and configured for communicating real-time events associated with the contributing servers. Finally, a Redundant Arrays of Independent Disks (RAID) is logically created by aggregating the excess storage capacity such that redundancy protects the storage against failure from any of the contributing servers. The RAID is accessible via Input/Output (I/O) operations over the network connection by using an Internet Small Computers Systems Interface (iSCSI) protocol.

DETAILED DESCRIPTION

A "resource" as used herein refers to a service, an application, a processing environment, a user, a client machine, a server machine, a group of users, a role associated with a user or groups of users, a policy, a website, a proxy, a device, data or content, or various combinations of these things.

The terms "client" and "server" (types of resources) are used herein and below. These terms are referenced within the context of a client and server architecture, where one machine (device with processor and storage capabilities) acts as server over a network (such as the Internet or another wide-area network (WAN)) and one machine acts as a client to perform network transactions (such as Input/Output (I/O) operations against storage). The machine that makes a request and the machine that services the request determine the designation of what it to be called the client and what is to be called the server. So, a machine making a request may be designated a client and a machine servicing that request may be designated a server. The designations between client and server can change with different transactions, such that a client becomes a server and vice versa.

Various embodiments of this invention can be implemented in existing network architectures. For example, in some embodiments, the techniques presented herein are implemented in whole or in part in the Novell® network and proxy server products, directory products, operating system (OS) products, and/or identity based products, distributed by Novell®, Inc., of Provo, Utah.

Of course, the embodiments of the invention can be implemented in a variety of architectural platforms, OS and server systems, or applications. Any particular architectural layout or implementation presented herein is provided for purposes of illustration and comprehension only and is not intended to limit aspects of the invention.

Figure 1:
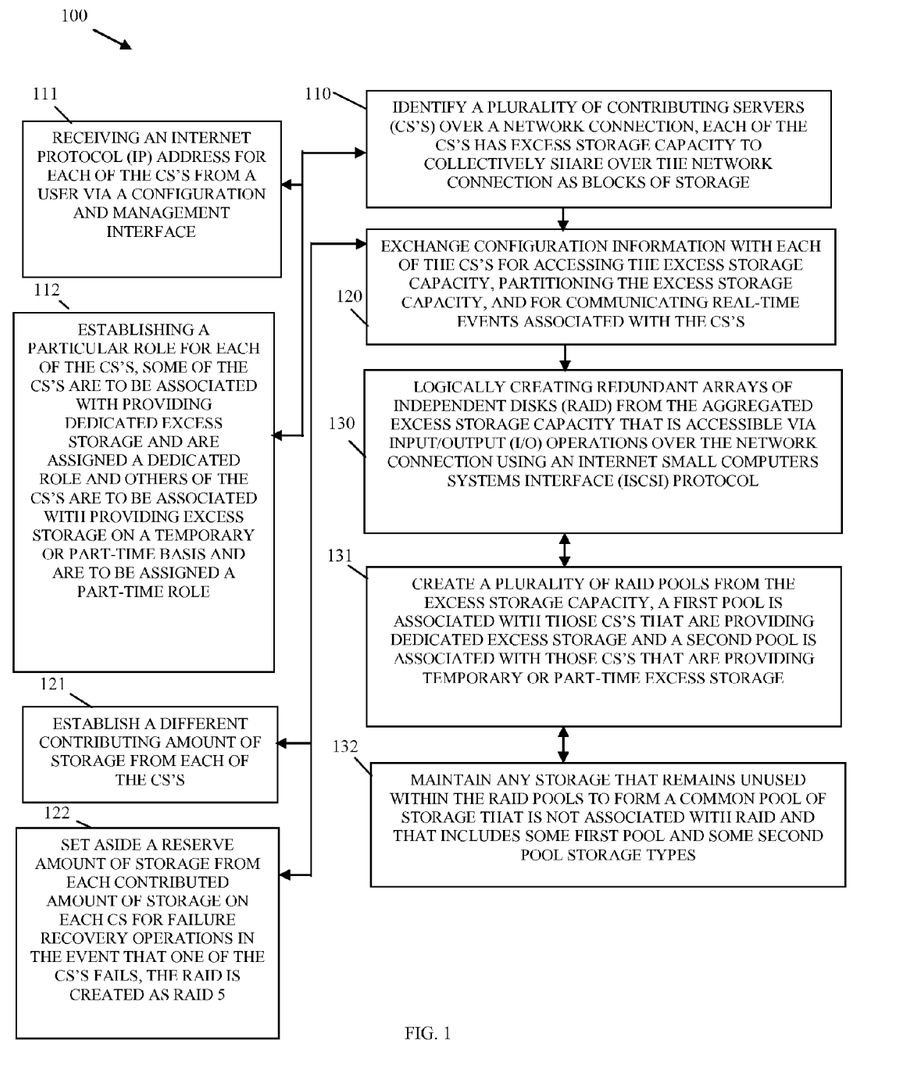
FIG. 1 is a diagram of a method for distributed storage aggregation, according to an example embodiment.

FIG. 1 is a diagram of a method 100 for distributed storage aggregation, according to an example embodiment. The method 100 (hereinafter "storage aggregation server") is implemented in a machine-accessible and readable medium as instructions that process on a network machine. The storage aggregation server is operational over and processes within a network. The network may be wired, wireless, or a combination of wired and wireless. In an embodiment, the network is the Internet.

At 110, the storage aggregation server identifies a plurality of contributing servers over a network connection. Each of the contributing servers has excess storage capacity to collectively share over the network connection. The excess storage capacity is represented as blocks of available storage. In other words, blocked storage is shared at a block level and not just a file level. Again, entire blocks of storage on volumes associated with the contributing servers are shared over the network and identified by the storage aggregation server at 110.

In an embodiment, at 111, the storage aggregation server receives an Internet Protocol (IP) address for each of the contributing servers from a user. The user interacts with the storage aggregation server via a configuration and management interface to supply, register, identify, and configure each of the contributing servers.

According to an embodiment, at 112, the storage aggregation server also establishes a particular role for each of the contributing servers. So, some of the contributing servers may be associated with providing dedicated excess storage and are thus associated or assigned a dedicated storage role. Others of the contributing servers may be associated with providing part-time or temporary storage and are thus associated or assigned a part-time or temporary role. In practice, larger blocks of storage are typically associated with dedicated storage roles and small blocks of storage are associated with part-time or temporary storage. Temporary storage may also be associated with client devices of users dispersed over the network where the users desire to make some small percentage of their available excess storage capacity available for use via the storage aggregation server.

At 120, the storage aggregation server exchanges configuration information with each of the contributing servers. The configuration information is used for accessing the excess storage capacity, partitioning the excess storage capacity, and for communicating real-time events associated with the contributing servers during operation.

In an embodiment, at 121, the storage aggregation server establishes different contributing amounts of storage from each of the contributing servers. So, one contributing server may share 25 MB's whereas another contributing server may share 250 MB's. Each of the contributing servers can share an amount of storage that they are comfortable with sharing and do not have to be forced to share a predefined amount of storage with the storage aggregation server.

According to an embodiment, at 122, the storage aggregation server sets aside a reserve amount of storage from each contributed amount of storage and on each contributing server for failure or disaster recovery. So, failure recovery operations can be processed in the event that one of the contributing servers fails. In this particular situation, the storage aggregation server is created as a Redundant Array of Independent Disks (RAID) level 5. So, when a failure occurs with one of the contributing servers the other contributing servers can be used to recreate the missing or unavailable storage that is down, in this way disaster relief and failure recovery techniques can be built into the processing of the storage aggregation server.

At 130, the storage aggregation server logically creates a RAID from the aggregated excess storage capacity, such that the redundancy protects not only from a disk failure but also from failures associated with a whole contributing server. The RAID is accessible via Input/Output (I/O) operations over the network connection using an Internet Small Computers Systems Interface (iSCSI) protocol. Essentially, a disparate amount of different available storage from a plurality of contributing servers each provide their own amount of storage to make available and share over the network. The storage aggregation server organizes and partitions this into usable chunks of data or partitions and interacts with the contributing servers to permit the data as a whole to be accessed by network resources using iSCSI to perform I/O against as if the available data were a RAID. The network resources treat and use the excess storage as if it were another RAID when in fact the storage is dispersed over the network and managed by the storage aggregation server in cooperation with the contributing servers.

In an embodiment, at 131, the storage aggregation server can also create and maintain separate RAID pools within the excess storage capacity. One pool is associated with contributing servers that are providing dedicated storage and another pool is associated contributing servers that are providing temporary or part-time storage. Again, temporary or part-time storage may be associated with user-based client devices where only small and spotty storage is provided for use on a part-time basis. This allows any user with a client machine to share storage when it is convenient for the user to do so and still be able to take advantage of this situation.

According to an embodiment, at 132, the storage aggregation server uses any remaining storage that is not designated as dedicated or part-time (according to the processing at 131) to form a common pool of storage, which is not associated with the RAID. The common pool includes some of the first pool and some of the second pool storage types. This common pool can be manually administered and may include storage fragments that are not large enough to be associated with the dedicated or part-time storage pools.

It is now appreciated how storage can be registered, partitioned, and configured over a network and organized as a RAID. The RAID is accessible via iSCSI to network resources (users and automated services) over the network as if it were a normal storage device. This technique can help enterprises reduce storage expenditures and better manage growth and at the same time achieve increased storage usage and efficiency.

A few example implementations and an example scenario is presented herein and below to further illustrate and highlight the features of the storage aggregation server, discussed above with reference to the FIG. 1.

Storage Aggregation Server and Contributing Server Approaches

Unused space is aggregated from network desktops/servers in an organization manner to form a large usable pool of storage. This is done in a manner that facilitates implementation of RAID above the aggregated storage. To achieve this two main software components are used:

1. Contributing server software: this resides on the machine which that contributes storage space to the common pool; and 2. Aggregating Server software: the Aggregating server software sits on the machine that takes care of aggregating and implementing RAID over the contributed storage.

The contribution done by contributing server is in fixed element sizes to ease and automate the implementation of RAID on the contributed elements.

Contributing Server Software (Contributing Server)

There are two types:—

1) Dedicated contributing server: this has no other responsibility than contributing storage to the common pool. This is specially created server for this subsystem. This can be used for a Disaster Managed Storage solution; and 2) Part time contributing server: this is for those machines that are not dedicated for contributing storage. They can be existing desktop or servers (already in use for some purpose) which have unused storage space which can be contributed.

Separate pools of partitions for these two different categories are created on the aggregating server. As the dedicated server contributes higher amount of storage and has lesser probability of failure so the element size for this type can be significantly larger.

This consists of three components:—

1) A transport layer component: the layer that uses iSCSI. This helps the contributing and aggregating servers identify each other, connect to each other and communicate some special conditions like informing each other degraded states such as a reboot sequence. It responds to the aggregating software's heartbeat messages. It identifies itself as a dedicated or a part time server. Based on its role, the aggregating software responds with the element size of storage contributions.

2) Core device management and IO processing layer: this layer presents the disk and writes the data to the contributed components. It aggregates all the components contributed by the user/administrator to the system. After aggregating the components it again divides the aggregated storage into chunks of the element size as given by the aggregating server. These newly formed partitions are presented to the aggregating server. The contributions can be from multiple block data storage devices/disks. This layer keeps a block wise map of the presented disk between the contributed components. This receives the IO packets and redirects it to the appropriate disk.

3) Configuration and management layer: this gives the user an interface to configure the contribution server. The user uses this to assign role (dedicated/part time). This layer also gives an interface to the user to select the components that he/she wants to contribute. If the user wants to remove any contributed element this layer coordinates with the other two layers and checks with the aggregating server to see if the element is in use. If so, it will warn the user of the consequences of the same. This layer also integrates the shutdown and startup services of the contributing server with the transport layer. It communicates all these events (startup, shutdown and reboot, etc.) to the aggregating server.

Aggregating Server Software

A transport layer corresponding to the transport layer on the contributing server side. It identifies the contributing server and its role. It maintains data of all the connected contributing servers. It sends heartbeat messages if any contributing server goes dormant for a specified interval of time. It exchanges initial configuration parameters like the element size of storage contribution. It receives special events like reboot or shutdown. It also marks the server as degraded or down based on the event and informs the other layers of such events. It also responds to special queries, such as if a particular element is USED or FREE; this is used by the contributing side for removing a contribution.

A device management layer takes care of integrating this application with a RAID layer. It maintains the data of all the devices that have been contributed. In an embodiment, this is done by maintaining three pools of partitions.

1) A pool for elements contributed by dedicated contributing servers;
2) A pool for elements contributed by part time contributing servers; and
3) A common pool of elements which consists of elements that are contributed by either type of contributing servers but are not of the size that is configured for the same. The storage of this pool is not integrated with RAID. The administrator can manually manage this pool of elements.

This layer takes care of implementing RAID on the elements of the first two pools. It ensures that the RAID is properly configured, such that at any point if time when a failure occurs on any contributing server there is not any data loss. This can be done by ensuring that all the partitions in any RAID set are from a different contributing server. Based on the initial configuration done by an administrator, the aggregating server keeps some reserve sub pool in every storage pool, which is used when there for any device failure. In case any component (contributing server or any contributed element) fails, the aggregation server automatically replaces the failed elements from the reserve sub pool. All the storage elements which were not RAIDED (due to unavailability of enough resources) also go into the reserve pool. For example, there can be instance when only one storage element in the storage pool is left out due to all the other elements already being consumed by existing RAID sets. All the elements that are RAIDED and exposed to the outer world (network, file system) are marked as USED.

Configuration and Management layer, this provides an interface to the user to configure/manage the system. The user sets the element size for every pool and the reserve storage size of every pool. The user is also responsible for giving the IP address of all the contributing servers. The user is able to change any RAID set; destroy an existing RAID set; or manually create a new RAID set from the reserve sub pool.

The storage aggregation server has a variety of practical uses, such as a disaster management tool and a tool to consolidate unused storage space on distributed network machines for purposes of creating a common storage pool.

Consider two example scenarios for further illustration of the storage aggregation server.

When used as a Disaster Management Tool:

Assume a scenario where there are 3 dedicated contributing servers located at 3 different sites. Each dedicated server has 2 disks of 1 TB each. The element size for contribution is configured to be 250 GB and the RAID level at 5.

Sequence of events for setup configuration:
1. User enters the IP address of the contributing servers in the aggregating servers.
2. Contributing servers and the aggregating servers are connected as a part of connection they exchange configuration parameters like element size.
3. Based on the element size the contributing server divides the 1 TB disk into partitions of 250 GB. So four partitions of this size are created.
4. A little less than 24 GB is left on every contributing server.
5. All the contributing servers present these newly formed partitions to the aggregating server as iSCSI partitions.
6. At the aggregating server side these partitions are used to form raid groups. This software picks one element from each of these contributing servers. In this case it picks three 250 GB partitions, each from different server and then RAID them to form a new device of 500 GB.
7. So there are four 500 GB disk partitions that are created. These are then used by the upper layers like file system/database etc.
8. The remaining 24 GB on every contributing server is also presented to the aggregating server. The aggregating server keeps these in a separate pool and the user has the option of manually exposing this to the upper layers.

Note that the above is a rather simple case of all the contributing servers containing plain 1 TB disks. This was done for purposes of not complicating the example use case and for purposes of ease of comprehension and illustration. Also, in general this kind of deployment has disks of very large size the whole of which is contributed to the system. When the contributing server has different partitions of various small and big sizes the scenario is different; such a case is explained in detail below. Therefore, it is noted that in practice the number of disks are much larger than what was presented in the example.

When used as a Tool to Aggregate unused Storage Space

Assume an organization of small/medium size having about 200 desktop machines and out of this total only about 25 users choose to contribute their unused storage space. The typical contribution that is expected is 60 GB on an average from each user machine, which means a total 1500 GB is contributed. Now if RAID 5 is implemented; it means a total of 1 TB (approximately) of usable space.

Initial setup configuration is the same as the above. Here, we can take a use case of how the contributing server aggregates the storage space to present it to the aggregating server. The algorithm is explained below; the main goal of the algorithm is to ensure that resized elements formed are such that any individual disk failure has minimum impact.

Example Algorithm for this operation:
1. Take all the disks contributed and sort them on size.
2. For all the partitions bigger than the element size as sent by the aggregating server during initial setup break it into the sizes of element size. Leaving the remaining size. Remove these partitions from the list.
3. All the remaining portions of the partitions that were operated on in the above size. Add them to the sorted list of partitions that are to be resized for contribution.
4. For the remaining partitions take the first partition, this will be the largest size as the list is sorted.
5. Assume the size of the partition picked in step 4 is of size P and element size is X. Scan through the list to obtain the largest size that is smaller than or equal to (X-P). Combine this with the partition found in step 4. Keep doing this until one does not find any such partition.
6. Finally, the size of the element formed in step 4 and step 5 might be equal to X or just smaller than X. Also, if it is less—the difference remaining is less than the smallest partition in the list. Now, pick the smallest partition from the list and break it to make the element of the required size (X).
7. Keep doing steps 4, 5 and 6 until all the partitions from the list are exhausted.
8. A residual storage space might be left on the list. This can be contributed on an as needed or desired basis.

Use Case Example:
Take the element size given by aggregating server as 25 GB. Now if a contributing server contributes partitions of 40 GB, 25 GB, 10 B and 10 GB. Here is how the above algorithm works.
1. Create a sorted list of partitions 40, 25, 10, 10.
2. Make a partition of 25 GB out of 40 GB one. New list is: 25, 15, 10, 10.
3. Pop out 25 GB partition from the list. New List is: 15, 10, 10.
4. Add 15 GB and 10 GB partition to make a new 25 GB partition.
5. In the end there are three 25 GB partitions and one 10 GB partition left for contribution.

Also in this kind of deployment it makes a lot of sense for the user to implement a reserve pool. He/She creates a reserve pool of say 10% so that if any contributing server goes down it can replace the faulting disks to ensure that further failures can be sustained.

Figure 2:
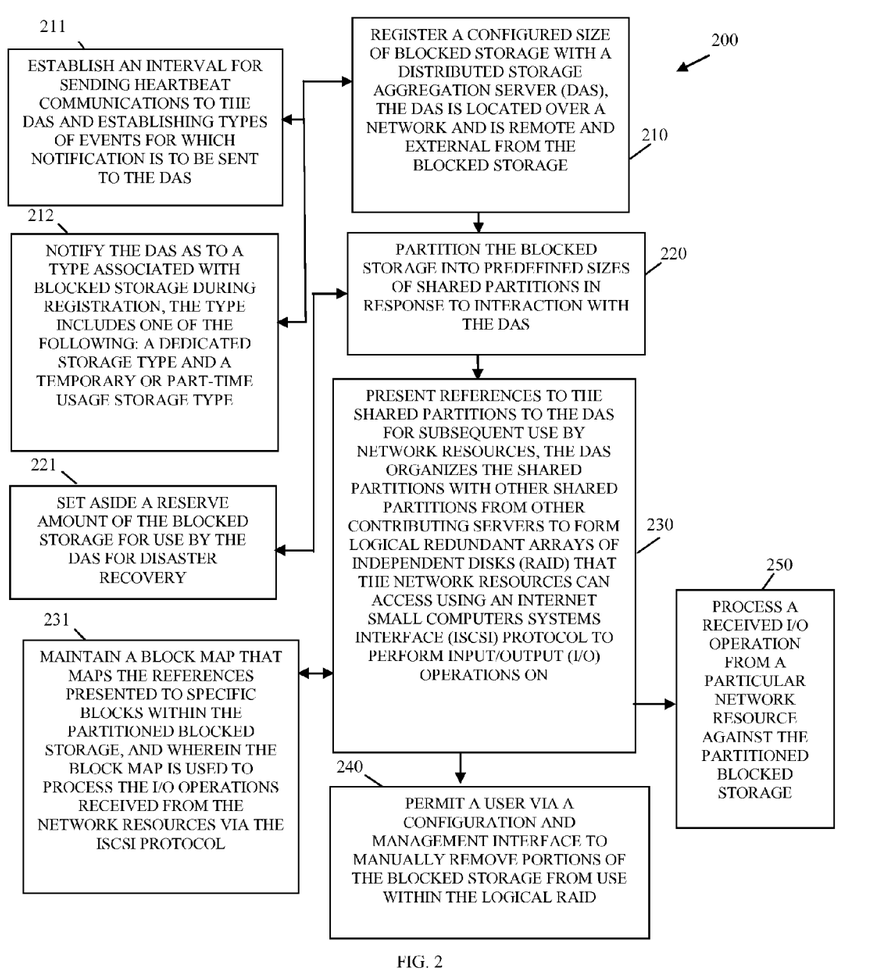
FIG. 2 is a diagram of another method for distributed storage aggregation, according to an example embodiment.

FIG. 2 is a diagram of another method 200 for distributed storage aggregation, according to an example embodiment. The method 200 (hereinafter "contributing server" is implemented in a machine-accessible and readable medium as instruction that process on a network machine. The contributing server is also operational over a network, and the network may be wired, wireless, or a combination of wired and wireless.

In an embodiment, the contributing server combines with a plurality of other contributing servers to interact with the storage aggregation server, which is represented by the method 100 of the FIG. 1, for purposes of logically presenting a RAID to network resources, where those network resources perform I/O against the logical RAID using an iSCSI protocol.

At 210, the contributing server registers a configurable size of blocked storage with a distributed aggregation server, such as the storage aggregation server represented by the method 100 of the FIG. 1. The distributed storage aggregation server is located over a network (such as the Internet) and is remote and external from the blocked storage. During the registration process a variety of configuration information can be communicated and established between the contributing server and the distributed aggregation server.

For example, at 211, the contributing server and the distributed aggregation server (during registration) establish an interval for sending heartbeat communications with one another. The contributing server also establishes types of events for which notification is to be sent to the distributed storage aggregation server. Some example types of events can include, reboot, shutdown, etc.

Also, at 212, the contributing server also notifies the distributed storage aggregation server as to a storage type that is to be associated with the blocked storage that is being registered with the distributed storage aggregation server. The type can include a dedicated storage type or a temporary or part-time usage storage type. Each of these types were discussed in detail above with reference to the method 100 of the FIG. 1.

At 220, the contributing server partitions the blocked storage into predefined sizes of shared partitions in response to interaction with the distributed storage aggregation server. That is, the distributed storage aggregation server interacts with and registers blocked storage from multiple other contributing servers, so the distributed storage aggregation server ensures that the blocks are partitioned into sizes defined and determined by the distributed storage aggregation server.

According to an embodiment, at 221, the contributing server sets aside a reserve amount of the blocked storage for use by the distributed storage aggregation server for disaster recovery. So, in a RAID 5 implementation each contributing server that the distributed storage aggregation server manages sets aside some amount of reserved space to keep track of parity and for use when a particular contributing server goes down for purposes of recreating that storage associated with a failed contributing server.

At 230, the contributing server presents references to the shared partitions back to the distributed storage aggregation server. The distributed storage aggregation server organizes the shared partitions with other shared partitions from other contributing servers of the network for purposes of forming a logical RAID. Network resources see the RAID and access it using an iSCSI protocol to perform desired I/O. The manner in which this can be done was discussed in detail above with reference to the method 100 of the FIG. 1.

In an embodiment, at 231, the contributing server also maintains a block map that maps the references, which were presented at 230, to specific blocks within the partitioned blocked storage. The block map is used to process the I/O operations, which are received from the network resources, via the iSCSI protocol. Essentially, the contributing server combines with the distributed storage aggregation server to provide distributed excess network storage as blocks of storage available via a RAID that users (one type of network resource) can issue I/O operations to via iSCSI.

According to an embodiment, at 240, the contributing server permits a user, via a configuration and management interface, to manually remove portions of the blocked storage from use within the logical RAID. So, an administrator can remove storage or even reconfigure the RAID. It is noted that blocks of storage can be added as well to the RAID.

In an embodiment, at 250, and at some later point in time after the RAID is formed and made available over the network, the contributing server receives an I/O operation from a particular network resource (user or automated program/service). In response, the contributing server processes the I/O operation against the partitioned blocked storage.

Figure 3:
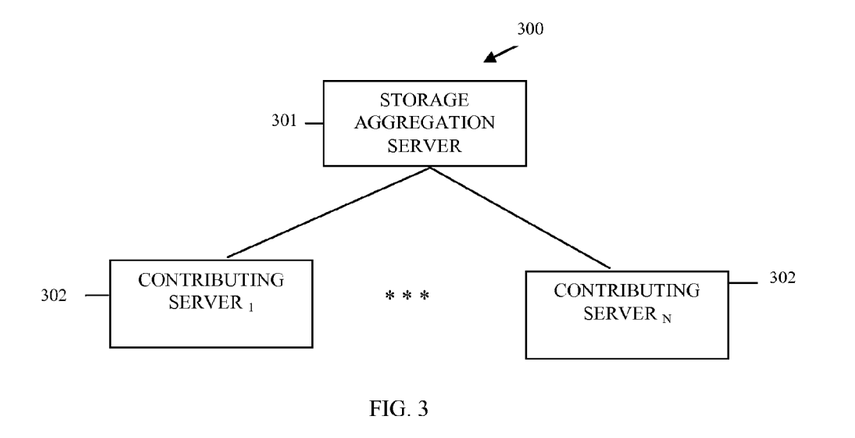
FIG. 3 is a diagram of a distributed storage aggregation system, according to an example embodiment.

FIG. 3 is a diagram of a distributed storage aggregation system 300, according to an example embodiment. The distributed storage aggregation system 300 is implemented in a machine-accessible and readable medium as instructions that process on one or more machines. Moreover, the distributed storage aggregation system 300 is operational over a network. The network may be wired, wireless, or a combination of wired and wireless. In an embodiment, the distributed storage aggregation system 300 implements, among other things, the storage aggregation server represented by the method 100 of the FIG. 1 and the contributing server represented by the method 200 of the FIG. 2.

The distributed storage aggregation system 300 includes a storage aggregation server 301 and a plurality of contributing servers 302. Each of these will now be discussed in turn.

The storage aggregation server 301 is implemented in a machine-accessible and computer-readable medium as instructions that execute on a machine (computer or processor-enabled device). Example processing associated with the storage aggregation server 301 was presented in detail above with reference to the method 100 of the FIG. 1.

The storage aggregation server 301 interacts over a network (such as the Internet) with each of the contributing servers 302 to identify and partition excess storage, which is located on each of the contributing servers 302. The storage aggregation server 301 organizes the aggregated excess storage as a logical RAID. Network resources can then perform I/O operations against the RAID using an iSCSI protocol.

According to an embodiment, the storage aggregation server 301 forms the RAID as RAID 5 (RAID level 5 with disaster recover capabilities).

In some cases, the storage aggregation server 301 includes an administrative interface that a user (type of network resource) can interact with for purposes of performing a variety of functions. One function permits the user, during initial configuration, to define a particular partition size for use with the RAID. Another feature permits the user to remove selective partitions from participation within the RAID. The user may even add new partitions manually via the administrative interface.

According to an embodiment, the storage aggregation server 301 detects that one of the contributing servers 302 has failed. The storage aggregation server 301 then dynamically and in real time re-creates the data from the failed contributing server 302 on remaining ones of the contributing servers 302 that are still available to ensure no loss of data access on the RAID.

In some situations, the storage aggregation server 301 maintains separate pools of data within the RAID. One pool is for dedicated and shared storage access across multiple contributing servers 302 and another pool is for temporary or part-time shared storage across the contributing servers 302.

The contributing servers 302 are each implemented in a machine-accessible and computer-readable medium as instructions that execute on a network machine; each contributing server 302 executing on a different network machine from remaining ones of the contributing servers 302. Example processing associated with the contributing servers 302 was provided in detail above with reference to the method 200 of the FIG. 2.

Each contributing server 302 can include its own administrative interface that permits user interaction and configuration. Moreover, each contributing server registers with the storage aggregation server 301 to supply some blocked storage for use within the RAID. Each contributing server 302 also receives, maps, and processes I/O to specific blocks of storage within its processing environment.

Figure 4:
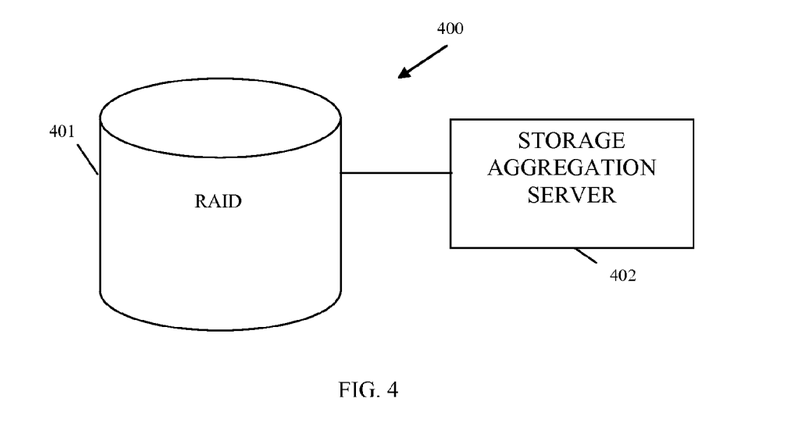
FIG. 4 is a diagram of another distributed storage aggregation system, according to an example embodiment.

FIG. 4 is a diagram of another distributed storage aggregation system 400, according to an example embodiment. The distributed storage aggregation system 400 is implemented in a machine-accessible and computer-readable medium and is processed on machines over a network. The network may be wired, wireless, or a combination of wired and wireless.

In an embodiment, the distributed storage aggregation system 400 implements among other things the processing represented by the method 100 of the FIG. 1 and the method 200 of the FIG. 2.

The distributed storage aggregation system 400 includes a RAID 401 and a storage aggregation server 402. Each of these and their interactions with one another will now be discussed in turn.

The RAID 401 is implemented across a plurality of machine-accessible and computer-readable media on a plurality of different contributing servers dispersed over a network. The RAID 401 is formed and established over the network by the storage aggregation server 402.

The RAID 401 appears as available storage to network resources. The storage can be accessed to process I/O operations using an iSCSI protocol.

The storage aggregation server 402 is implemented in a machine-accessible and computer-readable medium as instructions that execute on a machine of the network. Example processing associated with the storage aggregation server 402 was provided in detail above with reference to the FIG. 1.

The storage aggregation server 402 interacts with a plurality of contributing servers to designate and partition excess storage capacity on the contributing servers. The partitioned excess storage capacity is then organized and presented as the RAID 401. Network resources can then perform I/O operations against the RAID 401 using an iSCSI protocol.

According to an embodiment, the storage aggregation server 402 sets aside a reserve amount of storage on each contributing server within the RAID 401 as a whole for disaster recovery in an event that one of the contributing servers should fail.

In another case, the storage aggregation server 402 creates separate pools of data within the RAID 401. The pools are created and assigned depending upon whether the data associated with a particular pool is dedicated or temporarily available for access to the network resources.

In an embodiment, at least some of the contributing servers are client machines of users. The client machines are dispersed over the Internet and share excess capacity via the storage aggregation server 402. The excess capacity forms part of the RAID 401.

In one case, the storage aggregation server 402 is implemented on a same machine as at least one of the contributing servers. In a different case, each contributing server and the storage aggregation server 402 are all implemented on separate machines and are all dispersed over a network from one another, wherein the network is the Internet.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A machine-implemented method that executes on a storage aggregation server, comprising:

identifying, by the storage aggregation server, a plurality of contributing servers over a network connection, which is an Internet connection, each of the contributing servers have excess storage capacity that is collectively shared over the network connection as storage organized in blocks, the contributing servers identified, supplied, configured, and registered by a user via a configuration and management server interface;

exchanging, by the storage aggregation server, configuration information with each of the contributing servers, each contributing server accesses the excess storage capacity, partitions the excess storage capacity, and communicates real-time events with the other contributing servers based on the configuration information, each contributing server implemented as a separate machine and dispersed over the network from the other contributing servers;

logically creating, by the storage aggregation server, logical Redundant Arrays of Independent Disks (RAID) by aggregating the excess storage capacity over the Internet, the logical RAID is accessible via Input/Output (I/O) operations over the Internet using an Internet Small Computer Systems Interface (iSCSI) protocol and appears to be a physical RAID;

maintaining, by the storage aggregation server, the logical RAIDS in three pools, a first pool for dedicated contributing servers and a second pool for part-time contributing servers, and wherein the user assigns a role to a particular server that identifies that particular server's pool assignment; and using, by network resources over the network connection and via the iSCSI protocol, the excess storage capacity as if it were another physical RAID when in fact the excess storage capacity is dispersed over the network and managed by the storage aggregation server in cooperation with the contributing servers as the logical RAID, the excess storage capacity shared at the block level and not just the file level.

2. The method of claim 1, wherein identifying further includes receiving an Internet Protocol (IP) address for each of the contributing servers from the user via the configuration and management interface.

3. The method of claim 1, wherein exchanging further includes establishing a different contributing amount of storage from each of the contributing servers.

4. The method of claim 3, wherein exchanging further includes setting aside a reserve amount of storage from each contributed amount of storage on each contributing server for failure recovery operations in the event that one of the contributing servers fails, and wherein the logical RAID is created as logical RAID 5.

5. A machine-implemented method, comprising:

registering a configured size of storage as blocked storage with a distributed storage aggregation server, the distributed storage aggregation server is located over a network and is remote and external from the blocked storage, the network is the Internet and the block storage associated with sharing storage over the Internet at the block level and not just a file level, and the block storage assigned to being shared on a dedicated or part time basis, and the block storage registered by a user via a configuration and management interface by the user assigning a role to the block storage by selecting from: the dedicated basis and the part time basis;

partitioning the blocked storage into predefined sizes of shared partitions in response to interaction with the distributed storage aggregation server;

presenting references to the shared partitions to the distributed storage aggregation server for subsequent use by network resources;

organizing, by the distributed storage aggregation server, the shared partitions with other shared partitions from other contributing servers to form logical Redundant Arrays of Independent Disks (RAID) that the network resources access over the Internet using an Internet Small Computer Systems Interface (iSCSI) protocol performing Input/Output (I/O) operations on; and using, by the network resources over the network and via the iSCSI protocol, the shared partitions as if it were another physical RAID when in fact the shared partitions are dispersed over the network and managed by the distributed storage aggregation server in cooperation with the other contributing servers.

6. The method of claim 5, wherein registering further includes establishing an interval for sending heartbeat communications to the distributed storage aggregation server and establishing types of events for which notification is to be sent to the distributed storage aggregation server.

7. The method of claim 5, wherein registering further includes notifying the distributed storage aggregation server as to a type associated with blocked storage during registration, wherein the type includes one of the following: a dedicated storage type and a temporary or part-time usage storage type.

8. The method of claim 5, wherein partitioning further includes setting aside a reserve amount of the blocked storage for use by the distributed storage aggregation server for disaster recovery.

9. The method of claim 5, wherein presenting further includes maintaining a block map that maps the references presented to specific blocks within the partitioned blocked storage, and wherein the block map is used to process the I/O operations received from the network resources via the iSCSI protocol.

10. The method of claim 5, further comprising, permitting the user via the configuration and management interface to manually remove portions of the blocked storage from use within the logical RAID.

11. The method of claim 5 further comprising, processing a received I/O operation from a particular network resource against the partitioned blocked storage.

* * * * *

UNITED STATES PATENT AND TRADEMARK OFFICE
CERTIFICATE OF CORRECTION

| | | |
|---|---|---|
| PATENT NO. | : 8,713,127 B2 | Page 1 of 1 |
| APPLICATION NO. | : 12/025999 | |
| DATED | : April 29, 2014 | |
| INVENTOR(S) | : Hitesh Menghnani | |

It is certified that error appears in the above-identified patent and that said Letters Patent is hereby corrected as shown below:

In the Claims

In column 11 line 45, in Claim 1, delete "RAIDS" and insert --RAID--, therefor

Signed and Sealed this
Fourteenth Day of October, 2014

Michelle K. Lee
*Deputy Director of the United States Patent and Trademark Office*